Patented May 14, 1940

2,201,119

UNITED STATES PATENT OFFICE 2,201,119

EMULSIFYING AGENT AND ITS METHOD OF PRODUCTION

Manuel Blumer, Butler, George Andreas Kessler, Petrolia, and Leo Salzmann, Butler, Pa., assignors to L. Sonneborn Sons, Inc., a corporation of Delaware No Drawing. Application July 6, 1938, Serial No. 217,820

17 Claims. (Cl. 260—504)

This invention relates to new and useful emulsifying agents and their method of production.

The conventional refining treatment of certain lubricating oil distillates derived from petroleum includes the application of fuming sulphuric acid. This reacts with the oil, producing a black sludge containing unreacted sulphuric acid and certain types of sulphonic acids. Though the concentration of $SO_3$ in the fuming acid may vary considerably, a 20% fuming acid is employed in the majority of cases. As a result of the high degree of sulphonation obtained in the acid treatment, a considerable amount of sulphonic acids is produced. These are principally of two types, that is, the so-called water-soluble type predominantly contained in the sludge and the so-called oil-soluble type predominantly found in the oil to the extent of a few percent. The acid application is regulated in the manner well known in the art to produce the desired sulphonation reaction and in general temperatures not exceeding 140° F. are preferred. The acids contained in the sludge, while limitedly soluble, if at all, in hydrocarbon oils, are highly water-soluble, imparting to their aqueous solution a dark-green color, and being for this reason generally referred to as "green petroleum sulphonic acids". The acids left in solution in the oil impart a reddish color to the oil and for this reason are generally referred to as "mahogany petroleum sulphonic acids". After the separation of the oil from the acid sludge, the mahogany sulphonic acids are usually recovered from the oil in the form of a more or less crude mahogany sulphonate stock in accordance with ordinary refining methods comprising direct neutralization of the acid treated oil followed by suitable extraction. This mahogany sulphonate stock, either freed from retained oil, or, dissolved in retained oil, constitutes a valuable by-product of petroleum refining, being used for a variety of purposes but primarily as an emulsifying agent.

The hitherto known petroleum mahogany sulphonate stocks though possessing, when freshly made, emulsifying properties, are incapable of producing, without the use of auxiliary substances such as soaps, fatty acids, alkalis, etc., spontaneous oil-in-water emulsions, that is, emulsions that will spontaneously form when intimately contacting oil and water in the presence of the emulsifying agent and that, once formed, will remain substantially stable. They are furthermore characterized by a considerable instability in that their original emulsifying efficiency progressively lessens during storage.

One object of our invention comprises inter alia a mahogany sulphonate product substantially stable during storage and possessing such high emulsifying efficiency that spontaneous, stable oil-in-water emulsions can be procured without use of auxiliary substances.

Another object of our invention comprises such a mahogany sulphonate product substantially free from inorganic salts.

The formation of petroleum mahogany sulphonic acids in the acid treatment of lubricating oil distillates is accompanied by a number of side reactions such as oxidation, esterification, polymerization, and condensation, resulting in part in the production of substances that are detrimental to and impair the emulsifying and wetting efficiency of the recovered mahogany sulphonate stocks by which they are carried. Due to the fact, however, that the side reactions are to some extent but partial reactions, that are completed only after a comparatively long period of time, the mahogany sulphonate stocks, carrying the partial reaction products, will upon standing undergo changes in the direction of the completion of the side reactions resulting in the formation of an additional amount of emulsifying efficiency impairing substances, thus rendering the mahogany sulphonate stocks substantially unstable during storage. These deleterious substances are highly colored bodies of a tarry, resinous, highly viscous character of a water-in-oil emulsion forming type.

We have discovered that a mahogany sulphonate product of high emulsifying efficiency, capable of forming spontaneous stable oil-in-water emulsions and substantially free from water-in-oil emulsion forming substances can be obtained by treating a crude mahogany sulphonate stock, dissolved in a suitable water immiscible organic solvent, with an alkali hypochlorite. The solvents that may be used in accordance with our invention must be such as will not appreciably dissolve inorganic salts, liquid at normal temperatures and substantially neutral to alkali hypochlorite action. It is of course essential that petroleum mahogany sulphonate stocks be freely soluble therein. The boiling range of the solvents is preferably sufficiently low to permit their removal, if desired, in the customary manner such as by distillation in vacuo or otherwise without causing thereby a partial decomposition of the mahogany sulphonates. It is of advantage that the boiling point be so low and preferably between 75 and 250° F. as to enable the removal of the solvent at ordinary temperatures without the necessity of resorting to vacuum distillation. Suitable solvents that may be used in the practice of our invention are for instance petroleum oil distillates or any fractions thereof, benzol, naphtha, carbon tetrachloride, tetrochlorethane, chloroform, etc., and in general any aromatic or aliphatic or aryl or aralkyl hydrocarbons including their halogenated derivatives of the afore-described character and nature.

In the practical application of our invention the crude mahogany sulphonate stock is dissolved in the solvent and the solution is thereafter contacted with an alkali hypochlorite, such as sodium or potassium hypochlorite, preferably in aqueous solution as intimately as possible and preferably with the aid of agitation.

As a general rule the temperature of operation is not critical. In certain cases where the mahogany soap solution is relatively viscous, it is of advantage to operate at elevated temperatures though always below the boiling point of the solvent as in this fashion the intimate contact between the reactants is facilitated, thus favoring the time element of the treatment. For example, when using a mahogany sulphonate stock dissolved in a relatively viscous hydrocarbon fraction as it is derived for instance from the acid refining of a white oil stock, a temperature between 180° F. and 220° F. (the oil having a boiling point of substantially 225° F.) is preferred. On the other hand, when a mahogany sulphonate stock solution is of a less viscous character as when using a comparatively large amount of a relatively non-viscous solvent such as benzol or the like, ordinary temperature will suffice without unduly prolonging the operating time.

The amount of hypochlorite necessary for satisfactory results is best so adjusted that it will yield a mahogany sulphonate stock solution having at least 50% less total titratable alkalinity than it possessed before the treatment. We prefer, however, to use an amount of hypochlorite sufficient to yield substantially 100% less total titratable alkalinity. We have found that good results are obtained for procuring at least 50% reduction in alkalinity by using between 1 and 4% of hypochlorite (dry weight), preferably in aqueous solution, calculated on the dry weight of mahogany sulphonate stock in solution while in order to obtain total freedom from alkalinity, an amount of substantially 5% of hypochlorite is preferred.

The ratio of petroleum mahogany sulphonate stock to solvent is as a rule not critical except that it is desirable to so adjust the ratio that the viscosity of the solution is sufficiently low to permit the intimate contact between the reactants and the subsequent desirable speedy separation into layers as otherwise the total time of treatment may be undesirably prolonged. In most cases, however, a ratio of mahogany sulphonate stock to solvent of substantially 2:1 (by weight) will give satisfactory results.

As a mode of agitation any conventional method such as stirring, air blowing, shaking, etc. may be used.

The completion of the reaction, i. e., the substantial removal of water-in-oil emulsion forming substances is indicated by the color change of the petroleum mahogany sulphonate stock solution which possess an original Lovibond color of in excess of 15R and in many instances in excess of 20R. A color change to 8R or less and preferably to 2R (measured by the Lovibond system) connotes the accomplishment of the desired result. Whereas 1 to 4% of hypochlorite will give a Lovibond color of less than 8R but above 2R, an amount of 5% of hypochlorite is necessary to obtain a Lovibond color of substantially 2R.

After the reaction is completed, the agitated mix is left to stratify. Two layers will form, a lower aqueous layer containing predominantly inorganic matter and an upper solvent layer containing predominantly mahogany sulphonate products in solution.

After its separation from the lower layer, the top layer is worked up to remove undesirable inorganic impurities, notably alkali sulphates and chlorides. This may be accomplished by centrifuging, filter pressing, or other like conventional means. The removal of inorganic impurities is preferably carried out within substantially the same temperature range as the original hypochlorite treatment in order to maintain a sufficiently low viscosity permitting the ready removal of the inorganic salts. So for instance when the treatment of the mahogany sulphonate stock solution was carried out at a temperature of 220° F., it is advisable to maintain a temperature of 220° F. during the removal of the inorganic impurities. It is of course also possible to suitably reduce the viscosity by adding a less viscous water immiscible solvent substantially in the nature of a thinning solvent prior to the removal step and the inorganic impurities may then be separated at ordinary temperature. It is equally possible and sometimes of advantage to remove the inorganic impurities in accordance with the method described in a copending application of Kessler et al., Serial No. 104,181, Patent No. 2,140,263. If desired, one or more water washes may supplement this treatment so as to remove the last traces of water soluble sulphonates, i. e., green petroleum sulphonates that may have been carried through from the acid refining.

Though in the production of our novel petroleum mahogany sulphonate products any of the afore-mentioned solvents may be used with advantage, we prefer to use as the solvent that hydrocarbon fraction, the acid refining of which furnished the crude mahogany sulphonate stock. The ordinary crude mahogany sulphonate stock retains as a rule varying amounts of this hydrocarbon fraction commonly referred to as "retained oil" which carries the mahogany sulphonates in solution. The retained oil content of such crude stock is usually up to 36% or more and constitutes as such a convenient mahogany sulphonate solution that may be subjected directly to the hypochlorite treatment.

After the removal of the inorganic salts, the mahogany sulphonate product thus obtained may be used either as such, i. e., in the form of a solution in the solvent, such as retained oil, or may be further worked up, if desired, by removing the solvent and recovering a solvent-free mahogany sulphonate product. In either case the resulting products are substantially free from inorganic impurities and water-in-oil emulsion forming substances, capable of producing spontaneous stable emulsions, and will not deteriorate in their high emulsifying efficiency to any appreciable extent during storage. Where the hypochlorite treatment was carried to a Lovibond color of less than 8R but above 2R, the final product will contain traces of inorganic salts that are in some cases difficult, if not impossible, to remove. If the treatment, however, was carried to a Lovibond color of substantially 2R, the mahogany sulphonate product is free from any inorganic impurities and will yield water clear solutions in absolute alcohol.

The following example illustrates one method of carrying out our invention, using retained oil as the preferred solvent, but it is to be understood that such method is given by way of illustration and not of limitation.

Three thousand gallons of a 66% (by weight) crude mahogany sulphonate stock solution in retained oil, obtained from the acid refining of a medicinal white oil stock, is heated to 220° F., and thoroughly agitated with 1,000 gallons of a 14% aqueous sodium hypochlorite solution until the color is less than 8R (Lovibond system) and preferably substantially 2R. This result is obtained as a general rule after agitating for approximately three hours. The mix is then permitted to stratify whereupon the lower aqueous layer is drawn off and the top layer freed from its salt content by either centrifuging, filter pressing, or the like at a temperature of substantially 220° F., or, alternatively, by the above referred to Kessler-Blumer method. The recovered mahogany sulphonate solution in retained oil may be used as such, or, if desired, freed from its oil content in the conventional manner.

Inasmuch as the oil layer of an acid refined oil, after its separation from acid sludge, yields as such upon neutralization, a dilute hydrocarbon solution of a mahogany sulphonate stock, it is possible and we have found it sometimes of advantage to add the hypochlorite solution to the acid refined oil in the neutralization step, together with the neutralizing agent commonly employed for this purpose such as caustic soda. Withdrawal of a sample and analysis of the amount of sulphonic acids present in the acid refined oil will determine the amount of hypochlorite to be used, it being of course understood that at least between 1 and 4 and preferably 5% hypochlorite (calculated on the amount of mahogany sulphonate stock formed upon neutralization) are necessary for the successful operation of the treatment. After agitation and completion of the hypochlorite reaction as afore-described, the mahogany sulphonate products are extracted with alcohol, the latter being thereafter distilled off to yield a solution of mahogany sulphonate products in retained oil which may be then further treated for the removal of salts and/or retained oil in the afore-described manner. In this particular instance it is additionally possible and sometimes of advantage to remove the salts from the alcohol extract of the hypochlorite treated acid refined oil in accordance with the method described in the Blumer Patent No. 2,097,440 and to thereafter remove the alcohol and, if desired, the retained oil. One or more water washes may supplement the treatment.

Instead of resorting to the hypochlorite treatment and the subsequent removal of inorganic substances as separate operations, we have discovered that we may combine within the scope of our invention both treatments in one operation. For this purpose we dissolve the crude mahogany sulphonate stock in a solvent of the type previously specified but preferably additionally characterized by the fact that the solvent possesses at ordinary temperature a viscosity sufficiently low to permit ready gravity settling of the inorganic substances from its mahogany sulphonate solution without resort to auxiliary inorganic matter removing treatment. Preferred solvents of this type are for instance benzol, gasoline, carbon tetrachloride, and ethylenechloride. The ratio of solvent to soap is not critical but should be preferably so adjusted that the viscosity of the solution will not unduly interfere with the salt precipitation, and for best results a ratio of 1:1 is used. In practicing this treatment it is also possible and sometimes of advantage to use a mixture of solvents including a solvent mixture having one or more components individually possessing a higher viscosity than above specified for the preferred solvent provided the viscosity of the entire mix is of the desirable low order. So for example when using a mahogany sulphonate stock containing entrained oil, the same may be admixed with a suitable solvent of the above character such as benzol, using preferably equal amounts of benzol and mahogany sulphonate stock plus entrained oil. To this solution the requisite amount of hypochlorite solution as previously set forth is added. The mix is then thoroughly agitated until the hypochlorite reaction is completed as indicated by a Lovibond color of less than 8R and preferably substantially 2R. After stratification into layers, the mahogany sulphonate layer is separated from the aqueous layer and is now completely finished in its treatment including freedom from inorganic salts without any further additional purification steps. One or more water washes may follow if desired for the removal of traces of green sulphonic acids. In the practice of this method, elevated temperatures are as a rule not necessary as the viscosity is of the desired low order assuring intimate contact between the reactants without heating. The solvent or mixture of solvents may be removed in the conventional manner. As a general rule when having used retained oil as one of the components of a solvent mixture, it is of advantage as a matter of convenience to only remove the other component or components by distillation or the like to thereby recover the desired mahogany sulphonate product in solution in the retained oil.

In accordance with our invention, the hypochlorite treatment may be also carried out by procuring the formation of hypochlorite "in situ", i. e., in the mahogany sulphonate stock solution itself. This hypochlorite formation in situ may be obtained for instance by adding to the mahogany sulphonate stock solution a suitable caustic alkali such as sodium or potassium hydroxide in molecularly equivalent amount sufficient to produce upon passage of chlorine into the same the requisite amount of hypochlorite, i. e. from 1 to 5% by weight of the sulphonates present in solution. As a general rule between 5 and 6% of caustic in aqueous solution is sufficient to accomplish this purpose. In practicing this method room temperatures should be maintained and if necessary cooling must be resorted to when introducing the chlorine as otherwise the reaction favors the formation of alkali chlorate. The passage of chlorine is continued to the point where all free alkalinity in the solution has disappeared. During the passage of the chlorine into the solution, it is of course essential to obtain the required intimate contact between the reactants by suitable agitation. The alkali hypochlorite as it is formed in the mixture of mahogany sulphonate stock solution and caustic alkali acts on the mahogany sulphonate stock during its intimate contact therewith. The agitation is discontinued as soon as the passage of chlorine is stopped. The further treatment including stratification and purification is the same as previously described.

It is of course understood that the formation of hypochlorite "in situ" may be substituted in any of the afore-described hypochlorite treatments and regardless of whether removal of salts is accomplished as a separate finishing step or simultaneously with the hypochlorite treatment.

The hypochlorite treatment of a crude mahogany sulphonate stock will not only substantially remove water in oil emulsion forming substances, but will also effectively eliminate any ferriferous matter present in the stock either as original impurities or introduced by reason of the use of iron or steel equipment, thus not only yielding the novel mahogany sulphonate products of our invention substantially free from any iron content but also renderig the treatment as such entirely independent from any particular equipment or even the water supply used.

The hitherto never attained relatively light color of our new mahogany sulphonate products which will not darken during storage makes their application for a variety of purposes possible for the first time and particularly in the textile industry in connection with the wet treatment of light shade materials.

Where in the specification and claims reference is made to a given Lovibond color as possessed by a petroleum mahogany sulphonate or a petroleum mahogany sulphonate stock or product, we mean thereby that color value yielded in a half inch Lovibond cell by an approximately 6% solution of such substance (calculated on weight of mahogany sulphonates present) in a substantially colorless, transparent solvent, such as white oil.

The foregoing description is by way of illustration and not of limitation and we are not to be limited to any details but only by the appended claims in which we have endeavored to claim broadly all inherent novelty.

We claim:

1. A new emulsifying agent comprising essentially a petroleum mahogany sulphonate product derived from the acid treatment of a petroleum lubricating oil distillate under sulphonating conditions, said product being substantially free from water-in-oil emulsion forming substances.

2. A new emulsifying agent comprising essentially a petroleum mahogany sulphonate product derived from the acid treatment of a petroleum lubricating oil distillate under sulphonating conditions, said product being substantially free from water-in-oil emulsion-forming substances, substantially free from inorganic salts and possessing a Lovibond color of less than 8R.

3. A new emulsifying agent comprising essentially a petroleum mahogany sulphonate product derived from the acid treatment of a petroleum lubricating oil distillate under sulphonating conditions, said product being substantially free from water-in-oil emulsion-forming substances and substantially completely free from inorganic salts, possesses a Lovibond color of substantially 2R and is capable of yielding a water clear solution in absolute alcohol.

4. A new emulsifying agent comprising essentially a petroleum mahogany sulphonate product derived from the acid treatment of a petroleum lubricating oil distillate under sulphonating conditions, said product containing a solution of petroleum mahogany sulphonates in retained oil, being substantially free from water-in-oil emulsion-forming substances and substantially free from inorganic salts and possesses a Lovibond color of less than 8R.

5. A new emulsifying agent in accordance with claim 4 in which said product possesses a Lovibond color of substantially 2R and is capable of yielding a water clear solution in absolute alcohol.

6. Process for obtaining a new emulsifying agent comprising intimately contacting a solution of a petroleum mahogany sulphonate stock, derived from the acid treatment of a petroleum lubricating oil distillate under sulphonating conditions, in a water immiscible organic solvent with an alkali metal hypochlorite in amount sufficient to substantially remove thereby water-in-oil emulsion-forming substances and thereafter recovering a petroleum mahogany sulphonate product substantially stable during storage and capable of yielding substantially stable spontaneous oil-in-water emulsions, said solvent being substantially incapable of dissolving inorganic salts, liquid at normal temperatures and substantially inert to alkali hypochlorite action.

7. Process for obtaining a new emulsifying agent comprising intimately contacting in the presence of water a solution of a petroleum mahogany sulphonate stock, derived from the acid treatment of a petroleum lubricating oil distillate under sulphonating conditions, in a water immiscible organic solvent with an alkali metal hypochlorite in amount and for a period of time sufficient to yield a Lovibond color of less than 8R and thereafter recovering a petroleum mahogany sulphonate product substantially stable during storage and capable of yielding substantially stable spontaneous oil-in-water emulsions, said solvent being substantially incapable of dissolving inorganic salts, liquid at normal temperatures and substantially inert to alkali hypochlorite action.

8. Process for obtaining a new emulsifying agent comprising intimately contacting a solution of a petroleum mahogany sulphonate stock, derived from the acid treatment of a petroleum lubricating oil distillate under sulphonating conditions, in a water immiscible organic solvent with an aqueous solution of 1 to 5% of alkali metal hypochlorite, calculated on the amount of mahogany sulphonates present in the stock, for a period of time sufficient to yield a Lovibond color of less than 8R and thereafter recovering a petroleum mahogany sulphonate product substantially stable during storage and capable of yielding substantially stable spontaneous oil-in-water emulsions, said solvent being substantially incapable of dissolving inorganic salts, liquid at normal temperatures and substantially inert to alkali hypochlorite action.

9. Process in accordance with claim 8 in which said solvent is retained oil.

10. Process for obtaining a new emulsifying agent comprising intimately contacting a solution of a petroleum mahogany sulphonate stock, derived from the acid treatment of a petroleum lubricating oil distillate under sulphonating conditions, in a water immiscible organic solvent with an aqueous solution of caustic alkali and chlorine at substantially room temperature in molecularly equivalent amounts to yield substantially 1 to 5% of alkali metal hypochlorite, calculated on the amount of mahogany sulphonates present in the stock, for a period of time sufficient to yield a Lovibond color of less than 8R and thereafter recovering a petroleum mahogany sulphonate product substantially stable during storage and capable of yielding substantially stable spontaneous oil-in-water emulsions, said solvent being substantially incapable of dissolving inorganic salts, liquid at normal temperatures and substantially inert to alkali hypochlorite action.

11. Process in accordance with claim 10 in which said solvent is retained oil.

12. Process for obtaining a new emulsifying agent comprising intimately contacting a solution of a petroleum mahogany sulphonate stock, derived from the acid treatment of a petroleum lubricating oil distillate under sulphonating conditions, in a water immiscible organic solvent, of a viscosity sufficiently low to permit gravity settling of inorganic salts, with an aqueous solution of 1 to 5% of alkali metal hypochlorite, calculated on the amount of mahogany sulphonates present in the stock, for a period of time sufficient to yield a Lovibond color of less than 8R, thereafter permitting the formation of two liquid layers, a first layer being substantially free from inorganic salts and containing solvent and mahogany sulphonates and a second aqueous layer, thereafter separating said first from said second layer and recovering from said first layer a mahogany sulphonate product substantially free from inorganic salts, substantially stable during storage and capable of yielding substantially stable spontaneous oil-in-water emulsions, said solvent being substantially incapable of dissolving inorganic salts, liquid at normal temperatures and substantially inert to alkali hypochlorite action.

13. Process for obtaining a new emulsifying agent comprising intimately contacting a solution of a petroleum mahogany sulphonate stock, derived from the acid treatment of a petroleum lubricating oil distillate under sulphonating conditions, in a water immiscible organic solvent of a viscosity sufficiently low to permit gravity settling of inorganic salts, with an aqueous solution of caustic alkali and chlorine at substantially room temperature in molecularly equivalent amounts to yield substantially 1 to 5% of alkali metal hypochlorite, calculated on the amount of mahogany sulphonates present in the stock, for a period of time sufficient to yield a Lovibond color of less than 8R, thereafter permitting the formation of two liquid layers, a first layer being substantially free from inorganic salts and containing solvent and mahogany sulphonates and a second aqueous layer, thereafter separating said first from said second layer and recovering from said first layer a mahogany sulphonate product substantially free from inorganic salts, substantially stable during storage and capable of yielding substantially stable spontaneous oil-in-water emulsions, said solvent being substantially incapable of dissolving inorganic salts, liquid at normal temperatures and substantially inert to alkali hypochlorite action.

14. Process for obtaining a new emulsifying agent comprising intimately contacting a solution of a petroleum mahogany sulphonate stock, derived from the acid treatment of a petroleum lubricating oil distillate under sulphonating conditions, in a mixture of water immiscible organic solvents containing as one component thereof retained oil and possessing a viscosity sufficiently low to permit gravity settling of inorganic salts, with an aqueous solution of 1 to 5% of alkali metal hypochlorite, calculated on the amount of mahogany sulphonates present in the stock, for a period of time sufficient to yield a Lovibond color of less than 8R, thereafter permitting the formation of two liquid layers, a first layer being substantially free from inorganic salts and containing solvent and mahogany sulphonates and a second aqueous layer, thereafter separating said first layer from said second layer, removing said solvent mixture from said separated first layer at least to the extent of the components other than retained oil, and recovering a mahogany sulphonate product substantially free from inorganic salts, substantially stable during storage and capable of yielding substantially stable spontaneous oil-in-water emulsions, said solvent mixture being substantially incapable of dissolving inorganic salts, liquid at normal temperatures and substantially inert to alkali hypochlorite action.

15. Process for obtaining a new emulsifying agent comprising intimately contacting a solution of a petroleum mahogany sulphonate stock, derived from the acid treatment of a petroleum lubricating oil distillate under sulphonating conditions, in a mixture of water immiscible organic solvents containing as one component thereof retaining oil and possessing a viscosity sufficiently low to permit gravity settling of inorganic salts, with an aqueous solution of caustic alkali and chlorine at substantially room temperature in molecularly equivalent amounts to yield substantially 1 to 5% of alkali metal hypochlorite, calculated on the amount of mahogany sulphonates present in the stock, for a period of time sufficient to yield a Lovibond color of less than 8R, thereafter permitting the formation of two liquid layers, a first layer containing solvent and mahogany sulphonates, and a second aqueous layer, thereafter separating said first from said second layer, removing said solvent mixture from said separated first layer at least to the extent of the components other than retained oil, and recovering a mahogany sulphonate product substantially free from inorganic salts, substantially stable during storage and capable of yielding substantially stable spontaneous oil-in-water emulsions, said solvent mixture being substantially incapable of dissolving inorganic salts, liquid at normal temperatures and substantially inert to alkali hypochlorite action.

16. Process for obtaining a new emulsifying agent comprising intimately contacting a petroleum mahogany sulphonic acid solution in petroleum hydrocarbon oil, derived from the acid treatment of a petroleum lubricating oil distillate under sulphonating conditions, with caustic alkali in neutralizing amounts and substantially simultaneously therewith with an aqueous solution of 1 to 5% of alkali metal hypochlorite, calculated on the amount of petroleum mahogany sulphonates formed in the neutralization treatment, for a period of time sufficient to yield a Lovibond color of less than 8R, thereafter permitting the formation of 2 liquid layers, a first layer containing mahogany sulphonates dissolved in hydrocarbon oil and a second aqueous layer, thereafter separating said first from said second layer and finally treating said first layer, including solvent extraction and removal of inorganic salts, to recover a mahogany sulphonate product substantially free from inorganic salts, substantially stable during storage and capable of yielding substantially stable spontaneous oil-in-water emulsions.

17. Process for obtaining a new emulsifying agent comprising intimately contacting a petroleum mahogany sulphonic acid solution in petroleum hydrocarbon oil, derived from the acid treatment of a petroleum lubricating oil distillate under sulphonating conditions, with caustic alkali in excess of neutralizing amounts and with chlorine at substantially room temperature, said excess alkali and said chlorine being in molecularly equivalent amounts to yield substantially 1 to 5% of alkali metal hypochlorite, calculated on the amount of petroleum mahogany sulphonates formed in the neutralization treatment, for a period of time sufficient to yield a Lovibond color of less than 8R, thereafter permitting the formation of 2 liquid layers, a first layer containing mahogany sulphonates dissolved in hydrocarbon oil and a second aqueous layer, thereafter separating said first from said second layer and finally treating said first layer, including solvent extraction and removal of inorganic salts, to recover a mahogany sulphonate product substantially free from inorganic salts, substantially stable during storage and capable of yielding substantially stable spontaneous oil-in-water emulsions.

MANUEL BLUMER.
GEORGE ANDREAS KESSLER.
LEO SALZMANN.